United States Patent
Carrier et al.

(10) Patent No.: US 11,481,561 B2
(45) Date of Patent: Oct. 25, 2022

(54) SEMANTIC LINKAGE QUALIFICATION OF ONTOLOGICALLY RELATED ENTITIES

(71) Applicant: International Business Machines Corporation, Armonk, NY (US)

(72) Inventors: Scott Carrier, New Hill, NC (US); Jennifer Lynn La Rocca, Cary, NC (US); Rebecca Lynn Dahlman, Rochester, MN (US); Mario J. Lorenzo, Miami, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 216 days.

(21) Appl. No.: 16/940,625

(22) Filed: Jul. 28, 2020

(65) Prior Publication Data
US 2022/0036009 A1 Feb. 3, 2022

(51) Int. Cl.
| | | |
|---|---|---|
| G06F 40/30 | (2020.01) | |
| G06F 40/295 | (2020.01) | |
| G06F 40/205 | (2020.01) | |
| G06N 5/02 | (2006.01) | |

(52) U.S. Cl.
CPC ............ G06F 40/30 (2020.01); G06F 40/205 (2020.01); G06F 40/295 (2020.01); G06N 5/02 (2013.01)

(58) Field of Classification Search
None
See application file for complete search history.

(56) References Cited

U.S. PATENT DOCUMENTS

| | | | |
|---|---|---|---|
| 7,027,974 B1 * | 4/2006 | Busch | G06F 40/284 704/4 |
| 7,505,989 B2 | 3/2009 | Gardner et al. | |
| 7,558,778 B2 | 7/2009 | Carus et al. | |
| 9,189,531 B2 | 11/2015 | Joshi et al. | |
| 9,336,306 B2 | 5/2016 | McAteer et al. | |
| 9,436,760 B1 * | 9/2016 | Tacchi | G06F 16/9024 |
| 9,710,544 B1 * | 7/2017 | Smith | G06F 16/36 |
| 9,892,111 B2 | 2/2018 | Danielyan et al. | |
| 10,984,780 B2 * | 4/2021 | Bellegarda | G06N 3/0427 |

(Continued)

OTHER PUBLICATIONS

Carrier et al., "Custom Semantic Search Experience Driven By an Ontology" U.S. Appl. No. 16/940,673, filed Jul. 28, 2020.

(Continued)

*Primary Examiner* — Jesse S Pullias
(74) *Attorney, Agent, or Firm* — Cantor Colburn LLP; Kelsey M. Skodje

(57) ABSTRACT

Aspects of the present disclosure include determining, by a processor, an ontology, the ontology comprising a plurality of ontological relationships, receiving, by the processor, a plurality of passages, determining, by the processor, a target set of co-occurring entities comprising a first entity and a second entity, determining a first passage in the plurality of passages that includes the first entity and the second entity, determining, from the ontology, a first ontological relationship between the first entity and the second entity, analyzing the first passage to determine a congruency score for the first ontological relationship, and generating a relationship annotation between the first entity and the second entity in the first passages based on the congruency score being within a threshold.

20 Claims, 6 Drawing Sheets

(56) References Cited

U.S. PATENT DOCUMENTS

| | | | |
|---|---|---|---|
| 11,222,052 B2 * | 1/2022 | Hertz | G06K 9/6259 |
| 2003/0018616 A1 * | 1/2003 | Wilbanks | G16B 50/20 |
| 2006/0053172 A1 | 3/2006 | Gardner et al. | |
| 2007/0038609 A1 | 2/2007 | Wu et al. | |
| 2009/0164441 A1 | 6/2009 | Cheyer et al. | |
| 2009/0182738 A1 | 7/2009 | Marchisio et al. | |
| 2010/0036797 A1 | 2/2010 | Wong et al. | |
| 2012/0016678 A1 | 1/2012 | Gruber et al. | |
| 2013/0013580 A1 | 1/2013 | Geller et al. | |
| 2013/0311419 A1 | 11/2013 | Xing et al. | |
| 2014/0156638 A1 | 6/2014 | Joshi et al. | |
| 2014/0324864 A1 * | 10/2014 | Choe | G06F 16/73 707/737 |
| 2015/0120738 A1 * | 4/2015 | Srinivasan | G06F 16/285 707/739 |
| 2016/0379120 A1 * | 12/2016 | Merdivan | G06F 16/3344 706/46 |
| 2017/0329760 A1 * | 11/2017 | Rachevsky | G06F 40/253 |
| 2017/0357642 A1 | 12/2017 | Chapman et al. | |
| 2018/0107760 A1 | 4/2018 | Saha et al. | |
| 2021/0358601 A1 * | 11/2021 | Pillai | G16H 50/70 |

OTHER PUBLICATIONS

Carrier et al., "Replacing Mappings Within a Semantic Search Application Over a Commonly Enriched Corpus" U.S. Appl. No. 16/940,686, filed Jul. 28, 2020.

Celino et al., "Squiggle: a semantic search engine for indexing and retrieval of multimedia content." Proceedings of the 1st International Conference on Semantic-Enhanced Multimedia Presentation Systems-vol. 228. CEUR-WS.org, 2006, 84 pages.

Li et al., "A Semantic Search Engine for Spatial Web Portals," IGARSS 2008-2008 IEEE International Geoscience and Remote Sensing Symposium, vol. 2, 2008, pp. 1278-1281.

List of IBM Patents or Patent Applications Treated as Related; Date Filed: Jul. 28, 2020; 2 pages.

Makela, "Survey of Semantic Search Research," Proceedings of the Seminar on Knowledge Management on the Semantic Web, Department of Computer Science, University of Helsinki, 2005, 11 pages.

Pinheiro et al., "An Ontology Based-Approach for Semantic Search in Portals." Proceedings of the 15th International Workshop on Database and Expert Systems Applications, IEEE, 2004, 5 pages.

Wu et al., "Falcon-S: An Ontology-Based Approach to Searching Objects and Images in the Soccer Domain." Supplemental Proceedings of ISWC (2006), pp. 1-8.

* cited by examiner

SEMANTIC LINKAGE QUALIFICATION OF ONTOLOGICALLY RELATED ENTITIES

BACKGROUND

The present invention generally relates to natural language processing, and more specifically, to semantic linkage qualification of ontologically related entities.

Natural language processing (NLP) is a field of computer science, artificial intelligence, and linguistics concerned with the interactions between computers and human (natural) languages. As such, NLP is related to the area of human-computer interaction, and especially with regard to natural language understanding that enables computers to derive meaning from human or natural language input.

Many NLP systems make use of ontologies to assist in performing NLP tasks. An ontology is a representation of knowledge. A semantic ontology, in the case of NLP, is a representation of knowledge of the relationships between semantic concepts. Created by humans, usually by domain experts, ontologies are never a perfect representation of all available knowledge. Often they are very biased to a particular subarea of a given domain, and often reflect the level of knowledge or attention to detail of the author. Ontologies are usually task inspired, i.e. they have some utility in terms of managing information or managing physical entities and their design reflects the task for which their terminology is required. Generally speaking, the tasks hitherto targeted have not been focused on the needs of applications for cognitive computing or natural language processing and understanding.

Ontologies are often represented or modeled in hierarchical structures in which portions of knowledge may also be represented as nodes in a graph and relationships between these portions of knowledge can be represented as edges between the nodes. Examples of structures such as taxonomies and trees are limited variations, but generally speaking, ontology structures are highly conducive to being represented as a graph.

Examples of such semantic ontologies include the Unified Medical Language System (UMLS) semantic network for the medical domain, RXNORM for the drug domain, Foundational Model of Anatomy (FMA) for the human anatomy domain, and the like. The UMLS data asset, for example, consists of a large lexicon (millions) of instance surface forms in conjunction with an ontology of concepts and inter-concept relationships in the medical domain.

SUMMARY

Embodiments of the present invention are directed to a computer-implemented method for semantic linkage qualification of ontologically related entities. A non-limiting example of the computer-implemented method includes determining, by a processor, an ontology, the ontology comprising a plurality of ontological relationships, receiving, by the processor, a plurality of passages, determining, by the processor, a target set of co-occurring entities comprising a first entity and a second entity, determining a first passage in the plurality of passages that includes the first entity and the second entity, determining, from the ontology, a first ontological relationship between the first entity and the second entity, analyzing the first passage to determine a congruency score for the first ontological relationship, and generating a relationship annotation between the first entity and the second entity in the first passages based on the congruency score being within a threshold.

Embodiments of the present invention are directed to a system for semantic linkage qualification of ontologically related entities. A non-limiting example of the system includes determining, by a processor, an ontology, the ontology comprising a plurality of ontological relationships, receiving, by the processor, a plurality of passages, determining, by the processor, a target set of co-occurring entities comprising a first entity and a second entity, determining a first passage in the plurality of passages that includes the first entity and the second entity, determining, from the ontology, a first ontological relationship between the first entity and the second entity, analyzing the first passage to determine a congruency score for the first ontological relationship, and generating a relationship annotation between the first entity and the second entity in the first passages based on the congruency score being within a threshold.

Embodiments of the invention are directed to a computer program product for semantic linkage qualification of ontologically related entities, the computer program product comprising a computer readable storage medium having program instructions embodied therewith. The program instructions are executable by a processor to cause the processor to perform a method. A non-limiting example of the method includes determining, by a processor, an ontology, the ontology comprising a plurality of ontological relationships, receiving, by the processor, a plurality of passages, determining, by the processor, a target set of co-occurring entities comprising a first entity and a second entity, determining a first passage in the plurality of passages that includes the first entity and the second entity, determining, from the ontology, a first ontological relationship between the first entity and the second entity, analyzing the first passage to determine a congruency score for the first ontological relationship, and generating a relationship annotation between the first entity and the second entity in the first passages based on the congruency score being within a threshold.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
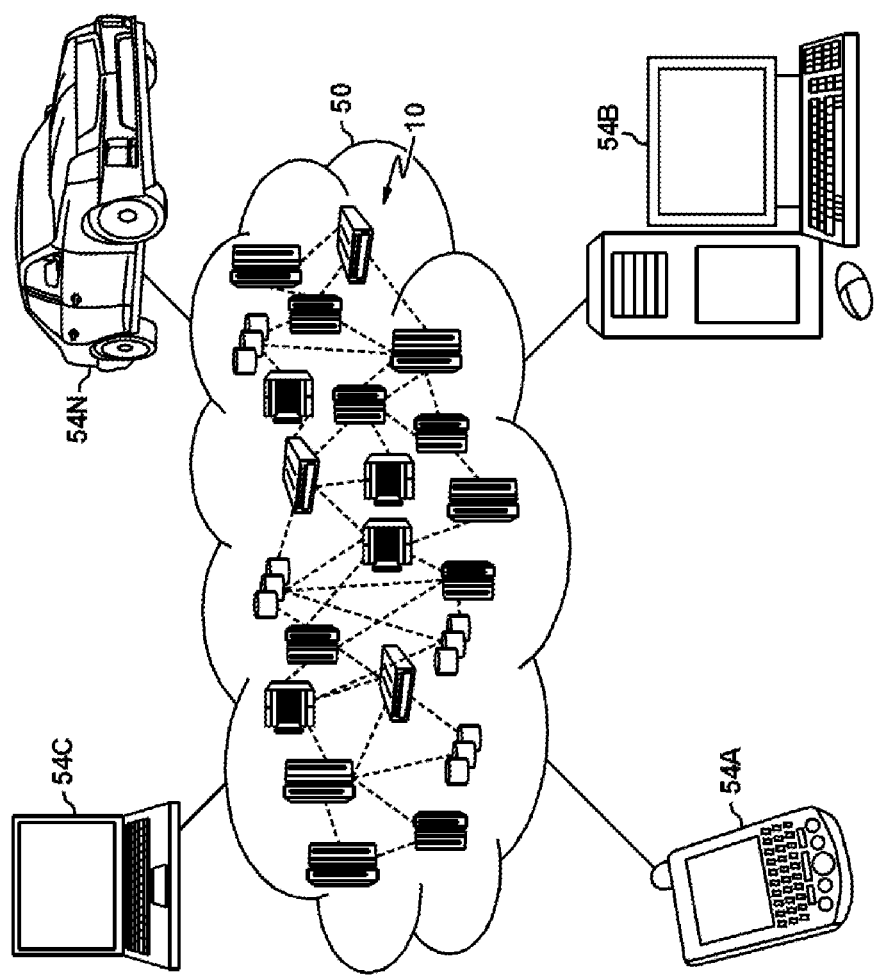
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
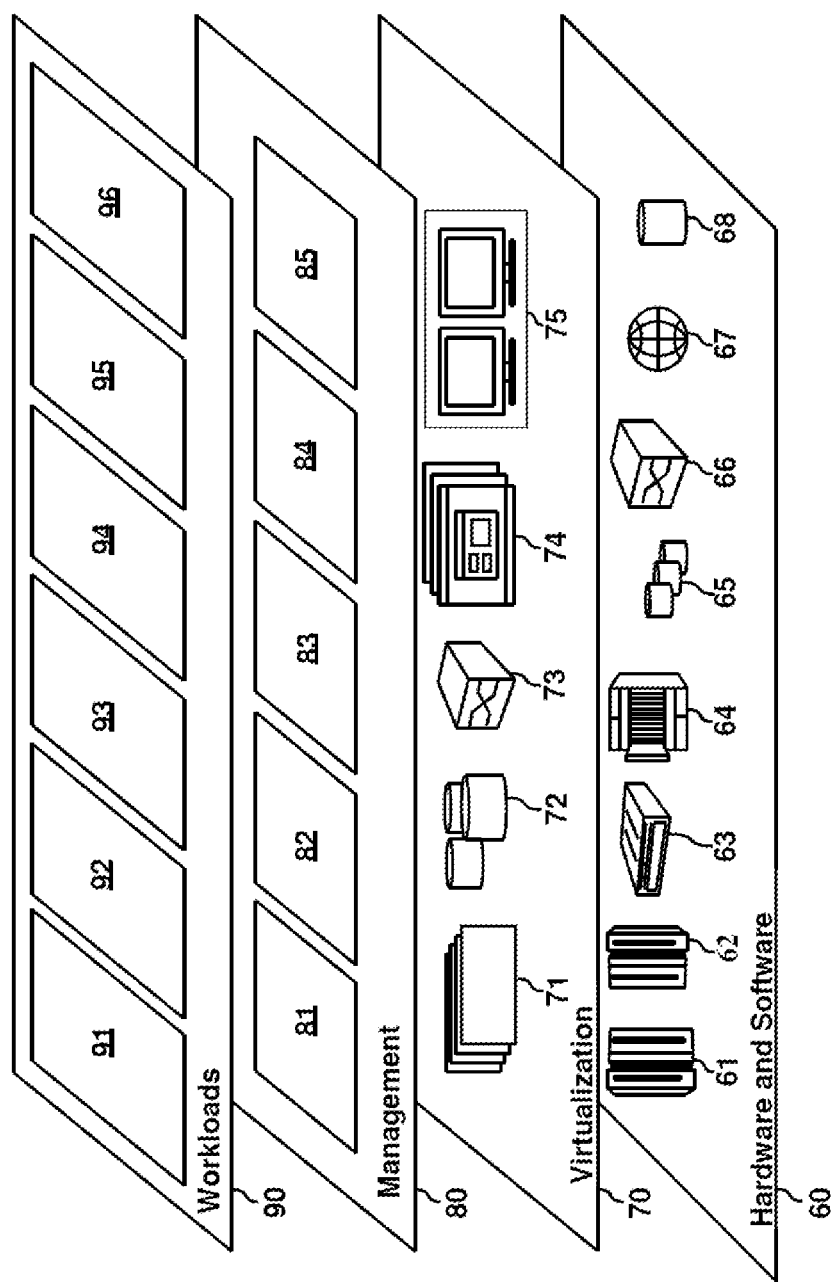
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and semantic linkage qualification.

Figure 3:
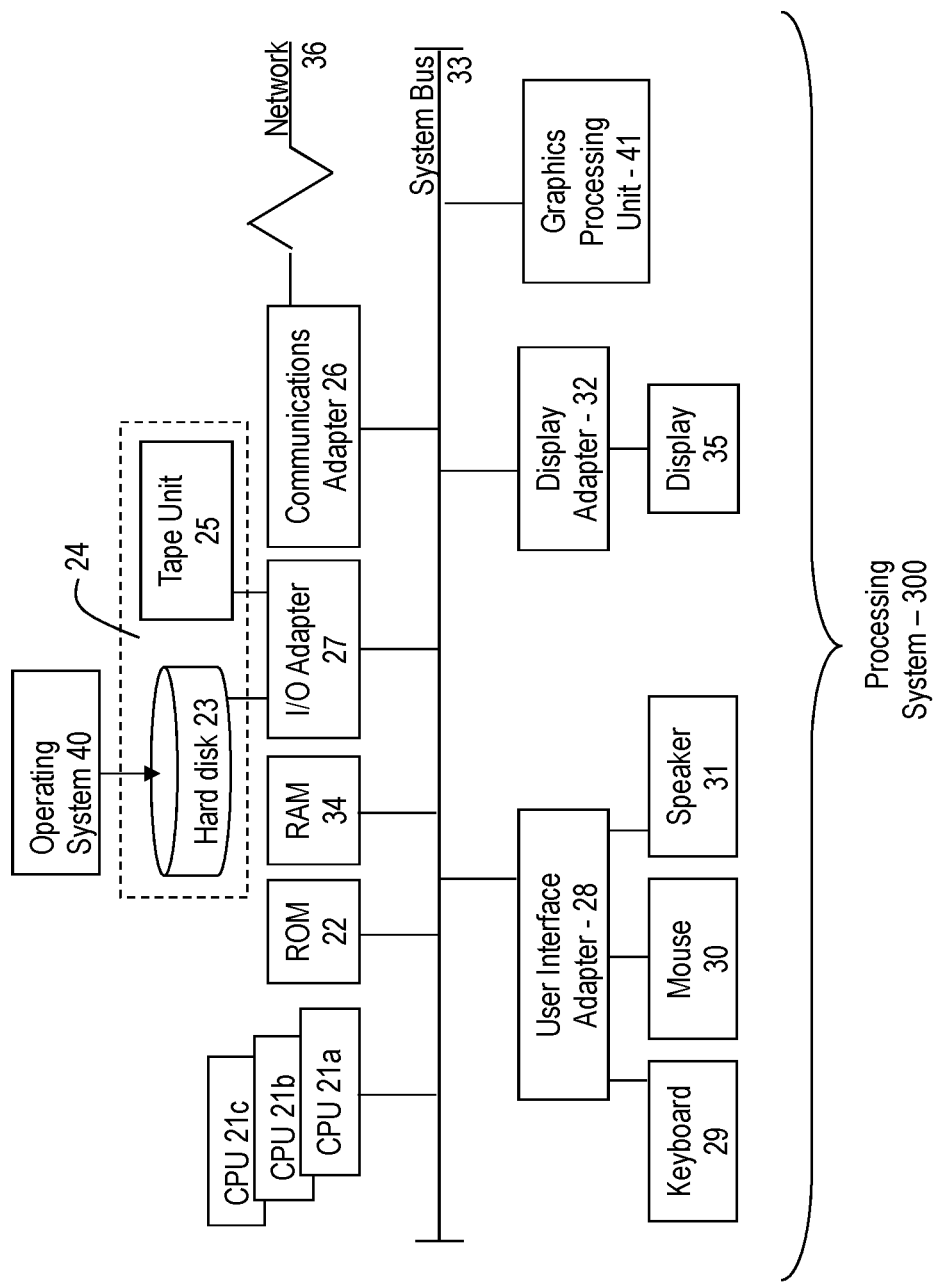
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system coordinate the functions of the various components shown in FIG. 3.

It is to be understood that the block diagram of FIG. 3 is not intended to indicate that the computer system 300 is to include all of the components shown in FIG. 3. Rather, the computer system 300 can include any appropriate fewer or additional components not illustrated in FIG. 3 (e.g., additional memory components, embedded controllers, modules, additional network interfaces, etc.). Further, the embodiments described herein with respect to computer system 300 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments Turning now to an overview of technologies that are more specifically relevant to aspects of the invention, in typical relation annotators, relation entities are created simply by the co-occurrence of entities within a passage regardless of whether the relationship is echoed (i.e., confirm) within the passage. An entity refers to a concept that includes either a word or phrase. In the medical field, entities can include concepts such as a treatment, condition, medication, prescription, therapy, and the like. These entities, when occurring in the same passage, can be related to each other through a pre-defined ontology or NLP model. When an ontology is applied to a passage containing co-occurring entities that are ontologically related, typical techniques would simply apply the ontological relationship to the co-occurring entities and move to the next passage. These techniques fail to look to semantic linkages within the passage to confirm the ontological relationship. For example, a passage may include the following sentence: "Insulin was evaluated but not prescribed for Mr. Jones who shows symptoms of diabetes." In this passage, two entities for a treatment and a condition exist. These entities are entity 1 (insulin) and entity 2 (diabetes). These entities would have an ontological relationship defined in an ontology, such as the Unified Medical Language System (UMLS). That ontological relationship could include relations such as, for example, treats, prescribed for, treatment, and like. However, a review of the passage does not necessarily, in this instance, confirm the ontological relationship. Specifically, the treatment (insulin) was not prescribed for the patient's condition (diabetes). Since the passage does not confirm the relationship, the ontological relation annotation would not be appropriate for this specific passage.

Going back a step further, the technique described above is a simplification of relation detection over training a relation detection model or authoring rules to detect related entities within a passage that semantically confirm the desired relationship. However, as detailed above, the cost of this simplification is ending up with ontological relations within passages that may or may not confirm said relation. Aspects of the present invention addresses that shortcoming by analyzing the intervening nodes of the co-occurring entities within a passage in a common manner, negating the need to train or author relation detection rules for each desired relationship. Technical benefits include given an ontology and the detection of the entities/nodes within said ontology, relationship annotations for ontologically related co-occurring concepts can be detected within a corpus over passages that confirm said relation.

Turning now to an overview of the aspects of the invention, one or more embodiments of the invention provide a relation annotator that produces relation annotations between co-occurring entities linked within an ontology. This annotator evaluates a passage where two ontologically linked entities co-occur to determine whether there exist any semantic linkages within the passage that are congruent with the relationship expressed within the ontology. That is to say, the surrounding neighborhood within a passage, document, and the like are analyzed to determine whether the ontological relation annotation can be confirmed by the existing words and phrases in the surrounding neighborhood of the co-occurring entities.

Figure 4:
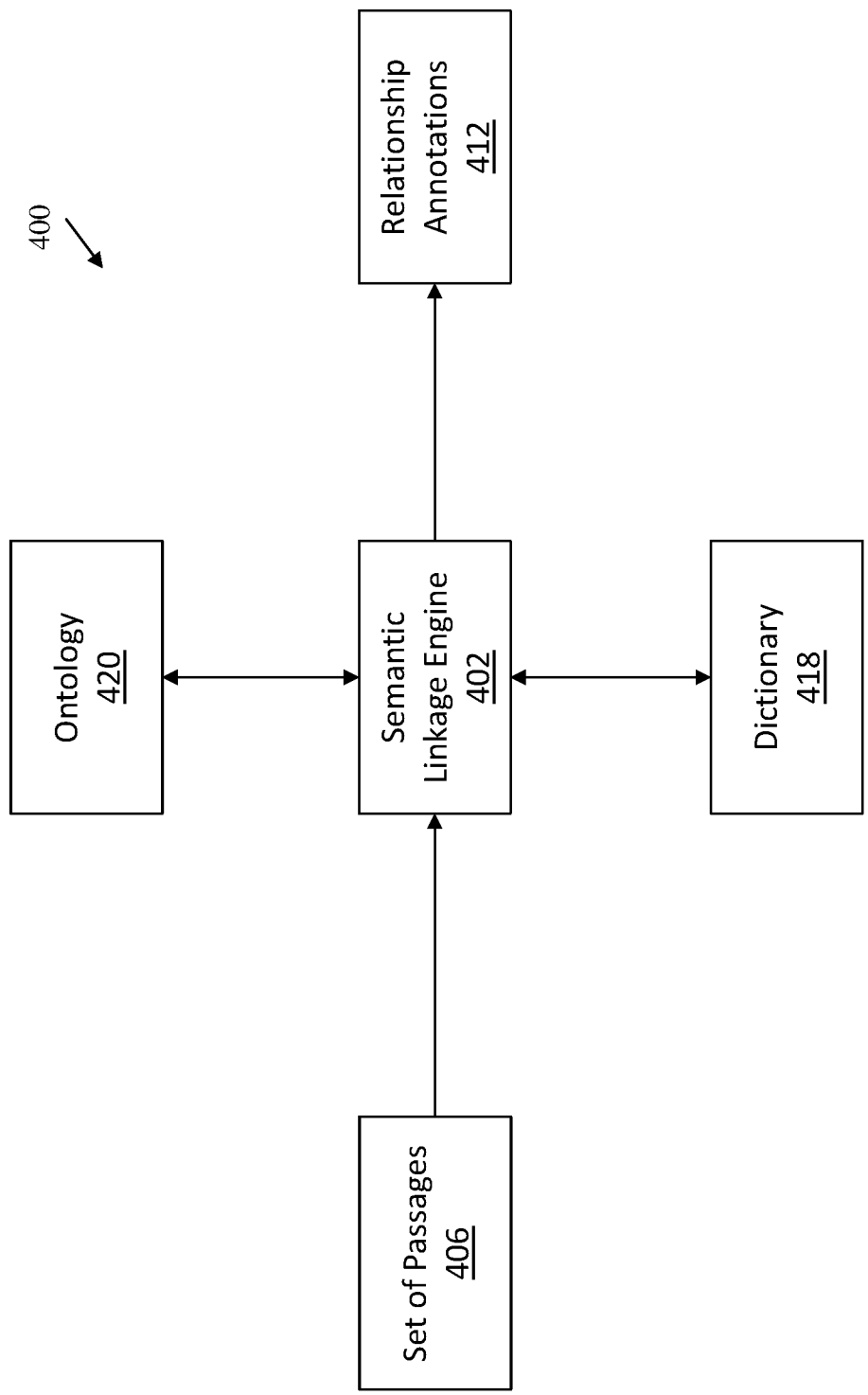
FIG. 4 depicts a system for semantic linkage qualification of ontologically related entities according to one or more embodiments of the present invention.

Turning now to a more detailed description of aspects of the present invention, FIG. 4 depicts a block diagram of a system for semantic linkage qualification of ontologically related entities according to one or more embodiments of the present invention. The system 400 includes a semantic linkage engine 402 that is configured and operable to analyze a set of passages 406 and utilize either an existing ontology 420 or a defined ontology having ontological relationship annotations for existing entities/concepts that are of interest. The semantic linkage engine 402 is further configured and operable to generate relationship annotations 412 for co-occurring entities that exists in passages in the set of passages 406. These relationship annotations 412 are generated as a confirmation of the ontological relationship annotation from the ontology 420 after a semantic analysis is performed on the passage to determine a congruency score between the ontological relationship and the other words, phrases, entities, and concepts found in the passage. In one or more embodiments of the invention, the passages described herein are natural language text and can vary in size and subject matter. For ease of description, the subject matter will be described herein for usage in the medical field, but this is not intended to limit the scope of the present invention to this field.

In one or more embodiments of the invention, pre-processing of the set of passages 406 can occur prior to analysis by the semantic linkage engine 402 utilizing a dictionary 418 or set of dictionaries. This pre-processing can include, but is not limited to, entity detection which can identify and define entities/concepts that exist in the set of passages 406 that are relevant. The entity detection can be performed utilizing techniques such as machine-learned or rule-based entity detection annotators. The semantic linkage engine 402 can automatically or through operation by a domain expert identify co-occurring entities having an ontological relation defined by the ontology 420 that are of interest to the domain expert. For example, co-occurring entities could be a diagnosis and an associated medication with an ontological relation being defined as treatment or prescription. As mentioned before, the pre-processing can perform entity detection to determine passages that have the exemplary co-occurring entities. The other words and phrases in the passage can be analyzed to determine a congruency for these words and phrases in the passage using semantic analysis. Semantic analysis refers to measuring contextual similarity between words and phrases in a passage. The semantic analysis is performed by the semantic linkage engine 402. During an analysis of a passage, the semantic linkage engine 402 can determine a congruency score between an ontological relation and the words and phrases in the passage. This congruency score can be compared to a pre-defined threshold to either confirm or reject the ontological relation taken from the ontology 420. If confirmed (i.e., the congruency score exceeds the threshold), the semantic linkage engine 402 can generate a relation annotation for the co-occurring entities in the passage and apply this relation annotation to the passage.

Figure 5:
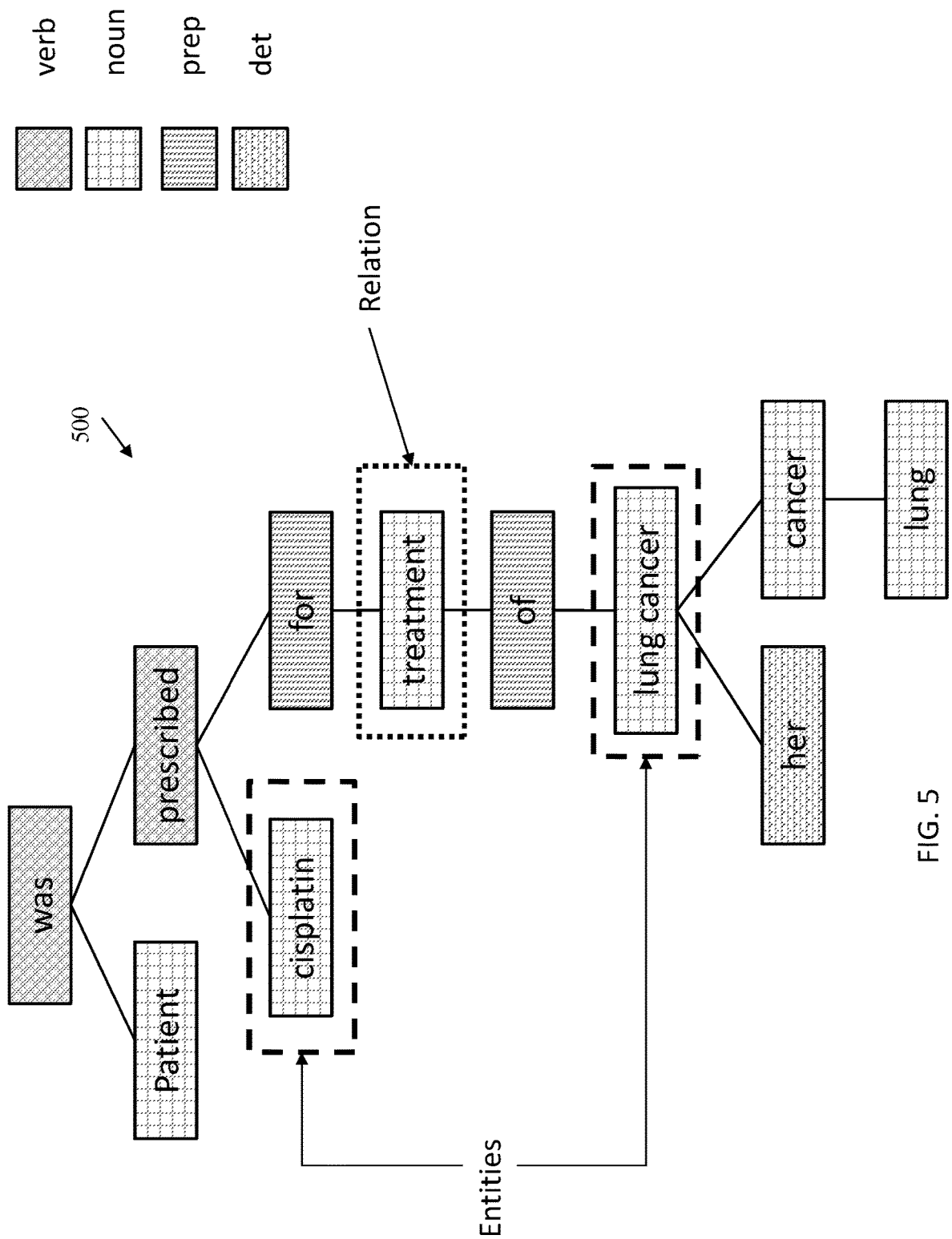
FIG. 5 depicts a block diagram representation of a parse tree for an exemplary passage according to one or more embodiments of the invention.

Semantic analysis can include parsing rules. FIG. 5 depicts a block diagram representation of a parse tree for an exemplary passage according to one or more embodiments of the invention. In the parse tree 500 there is an exemplary passage that states, "Patient was prescribed cisplatin for treatment of her lung cancer." The parse tree 500 parse the exemplary sentence into nodes representing either words or phrases (e.g., patient, lung cancer, etc.). The nodes are in a hierarchical structure and delineated by parts of speech (i.e., verb, noun, prepositional phrase, and determiner). In the exemplary passage, the two co-occurring entities are cisplatin (entity 1) and lung cancer (entity 2). The ontological relation for these two co-occurring entities can be "treats" and "prescribedfor". The ontology may store these ontological relations in the following format: <ENTITY1>—<RELATION>—<ENTITY2>. With that, the two co-occurring entities would show as Cisplatin—Treats—Lung Cancer and Cisplatin—PrescribedFor—Lung Cancer. Not that PrescribedFor is an ontological relation which can be further broken down into "Prescribed For" or simply "Prescribed." For the exemplary passage, a semantic analysis can be performed to determine that the ontological relations are congruent with the words and phrases of the passage. This can be performed using a variety of techniques including, but not limited to, any suitable vector formation and clustering technique to represent each training/validation set phrase in vector form and then determine a similarity or grouping of different vectors, such as by using a neural network language model representation techniques (e.g., Word2Vec, Doc2Vec, or similar tool) to convert words and phrases to vectors which are then input to a clustering algorithm to place words and phrases with similar meanings close to each other in a Euclidean space. The intervening nodes of the parse tree 500 constitute a set of tokens or words that can then be matched against the relation name, which may constitute one or more other words. Relation names such as "mayTreat" can be pre-processed to isolate the unique tokens/words therein. Now we have two sets of text (1. Intervening tokens from co-occurring entities in the passage) and (2. Tokens from the relation name), with which to analyze the degree of congruency or meaning. Techniques such as word movers distance, cosine similarity, and the like can be employed to assess the degree of similarity between the two text excerpts. Furthermore, stop words may be removed to reduce noise and polarity may be explicitly factored in as a penalty to the score—'polarity' in the sense that a token or word is negated in one set of text, but not the other (thus, the text may be highly similar, but the presence of the term 'no' can drastically change the meaning).

In one or more embodiments of the invention, the semantic linkage engine 402 can be implemented on the processing system 300 found in FIG. 3. The processing steps described with reference to the elements of FIG. 4 can be performed utilizing the processing system 300 in FIG. 3. Additionally, the cloud computing system 50 can be in wired or wireless electronic communication with one or all of the elements of the system 400. Cloud 50 can supplement, support or replace some or all of the functionality of the elements of the system 400. Additionally, some or all of the functionality of the elements of system 400 can be implemented as a node 10 (shown in FIGS. 1 and 2) of cloud 50. Cloud computing node 10 is only one example of a suitable cloud computing node and is not intended to suggest any limitation as to the scope of use or functionality of embodiments of the invention described herein.

In embodiments of the invention, the semantic linkage engine 402 can also be implemented as so-called classifiers (described in more detail below). In one or more embodiments of the invention, the features of the various engines/classifiers (402) described herein can be implemented on the processing system 300 shown in FIG. 3, or can be implemented on a neural network (not shown). In embodiments of the invention, the features of the engines/classifiers 402 can be implemented by configuring and arranging the processing system 300 to execute machine learning (ML) algorithms. In general, ML algorithms, in effect, extract features from received data (e.g., inputs to the engines 402) in order to "classify" the received data. Examples of suitable classifiers include but are not limited to neural networks (described in greater detail below), support vector machines (SVMs), logistic regression, decision trees, hidden Markov Models (HMMs), etc. The end result of the classifier's operations, i.e., the "classification," is to predict a class for the data. The ML algorithms apply machine learning techniques to the received data in order to, over time, create/train/update a unique "model." The learning or training performed by the engines/classifiers 402 can be supervised, unsupervised, or a hybrid that includes aspects of supervised and unsupervised learning. Supervised learning is when training data is already available and classified/labeled. Unsupervised learning is when training data is not classified/labeled so must be developed through iterations of the classifier. Unsupervised learning can utilize additional learning/training methods including, for example, clustering, anomaly detection, neural networks, deep learning, and the like.

In embodiments of the invention where the engines/classifiers 402 are implemented as neural networks, a resistive switching device (RSD) can be used as a connection (synapse) between a pre-neuron and a post-neuron, thus representing the connection weight in the form of device resistance. Neuromorphic systems are interconnected processor elements that act as simulated "neurons" and exchange "messages" between each other in the form of electronic signals. Similar to the so-called "plasticity" of synaptic neurotransmitter connections that carry messages between biological neurons, the connections in neuromorphic systems such as neural networks carry electronic messages between simulated neurons, which are provided with numeric weights that correspond to the strength or weakness of a given connection. The weights can be adjusted and tuned based on experience, making neuromorphic systems adaptive to inputs and capable of learning. For example, a neuromorphic/neural network for handwriting recognition is defined by a set of input neurons, which can be activated by the pixels of an input image. After being weighted and transformed by a function determined by the network's designer, the activations of these input neurons are then passed to other downstream neurons, which are often referred to as "hidden" neurons. This process is repeated until an output neuron is activated. Thus, the activated output neuron determines (or "learns") which character was read. Multiple pre-neurons and post-neurons can be connected through an array of RSD, which naturally expresses a fully-connected neural network. In the descriptions here, any functionality ascribed to the system 400 can be implemented using the processing system 300 applies.

The semantic linkage engine 402 can perform natural language processing (NLP) analysis techniques on the sets of passages 406 which are composed of natural language text. NLP is utilized to derive meaning from natural language. The semantic linkage engine 402 can analyze the set of passages 406 by parsing, syntactical analysis, morphological analysis, and other processes including statistical modeling and statistical analysis. The type of NLP analysis can vary by language and other considerations. The NLP analysis is utilized to generate a first set of NLP structures and/or features which can be utilized by the semantic linkage engine 402 to determine congruency between words and phrases in a passage. These NLP structures include a translation and/or interpretation of the natural language input, including synonymous variants thereof. The semantic linkage engine 402 can analyze the features to determine a context for the features. NLP analysis can be utilized to extract attributes (features) from the natural language. These extracted attributes can be analyzed by the semantic linkage engine 402 to determine a congruency score and compare this score to a pre-defined threshold to determine whether to generate a relation annotation for the passage being analyzed.

Figure 6:
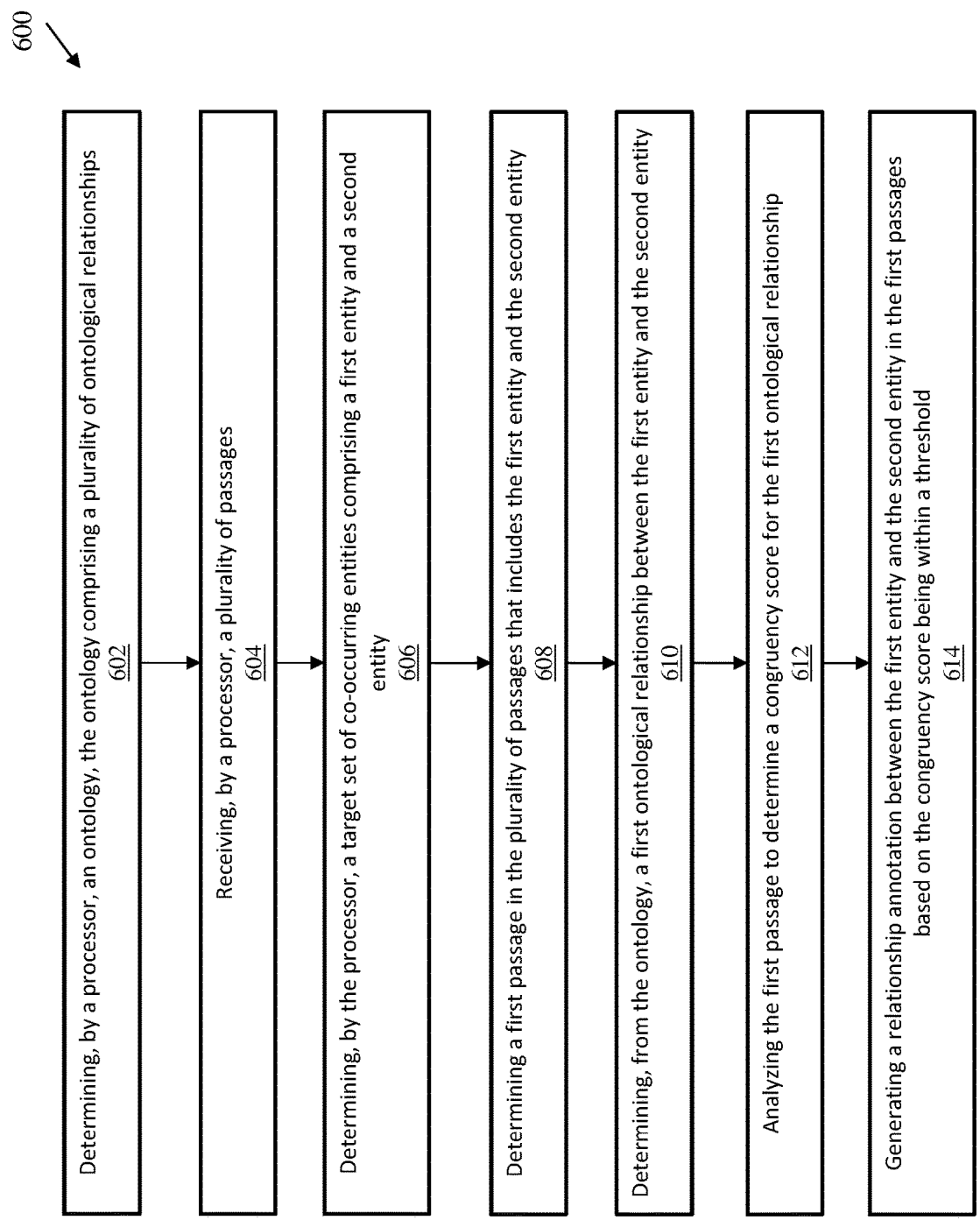
FIG. 6 depicts a flow diagram of a method for semantic linkage qualification of ontologically related entities according to one or more embodiments of the invention.

FIG. 6 depicts a flow diagram of a method for semantic linkage qualification of ontologically related entities according to one or more embodiments of the invention. The method 600 includes determining, by a processor, an ontology, the ontology comprising a plurality of ontological relationships, as shown in block 602. Determining includes receiving an ontology or creating an ontology that defines ontological relationships between entities of interest to a domain expert. The ontological relationships are chosen to be easily associated with the subject matter of the application of this method. For example, in the medical field, utilizing certain terms or jargon for the defined ontological relationships in the ontology assists with applying it to natural language passages being analyzed. The method 600, at block 604, includes receiving, by a processor, a plurality of passages. As noted above, the plurality of passages can be natural language text of a given subject matter or can be any natural language text depending on the scope of the ontology. At block 606 of the method 600, the method 600 includes determining, by the processor, a target set of co-occurring entities comprising a first entity and a second entity. The target co-occurring entities can be determined by a domain expert that is interested in these entities and looking to apply annotations for these entities. Also, at block 608, the method 600 includes determining a first passage in the plurality of passages that includes the first entity and the second entity. The first passage can be a sentence, paragraph, and document based on the application. The method 600, at block 610, includes determining, from the ontology, a first ontological relationship between the first entity and the second entity. Also, the method 600, at block 612, includes analyzing the first passage to determine a congruency score for the first ontological relationship. And at block 614, the method 600 includes generating a relationship annotation between the first entity and the second entity in the first passages based on the congruency score being within a threshold.

Additional processes may also be included. It should be understood that the processes depicted in FIG. 6 represent illustrations, and that other processes may be added or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   determining, by a processor, an ontology, the ontology comprising a plurality of ontological relationships;
   receiving, by the processor, a plurality of passages;
   determining, by the processor, a target set of co-occurring entities comprising a first entity and a second entity;
   determining a first passage in the plurality of passages that includes the first entity and the second entity;
   determining, from the ontology, a first ontological relationship between the first entity and the second entity;
   analyzing the first passage to determine whether there are intervening nodes within a semantic parse of the first passage that confirm the first ontological relationship expressed in the ontology, wherein the analysis of the first passage is encoded as a congruency score for the first ontological relationship; and
   generating a relationship annotation between the first entity and the second entity in the first passages based on the congruency score being within a threshold.

2. The computer-implemented method of claim 1, wherein analyzing the first passage comprises:
   generating a graph of the first passage, the graph comprising a plurality of nodes representing a plurality of words and phrases in the first passage; and
   analyzing a semantic linkage between the plurality of nodes and the first ontological relationship to determine the congruency score.

3. The computer-implemented method of claim 2, wherein analyzing the semantic linkage between the plurality of nodes and the first ontological relationship to determine the congruency score comprises:
   generating, by the processor utilizing a word embedding model, a word vector for each node in the plurality of nodes, the word vector comprising a plurality of features associated with the node; and
   comparing the word vector to a vector representation of the first ontological relationship to determine the congruency score.

4. The computer-implemented method of claim 3, wherein the congruency score comprises a geometric distance between the word vector plotted in a geometric space and the vector representation of the first ontological relationship plotted in the geometric space.

5. The computer-implemented method of claim 2, wherein the graph comprises a parse tree.

6. The computer-implemented method of claim 1, wherein the threshold is determined by a user input.

7. The computer-implemented method of claim 1, wherein the passage comprises a sentence.

8. A system comprising:
   a processor communicatively coupled to a memory, the processor configured to:
   determine an ontology, the ontology comprising a plurality of ontological relationships;
   receive a plurality of passages;

determine a target set of co-occurring entities comprising a first entity and a second entity;

determine a first passage in the plurality of passages that includes the first entity and the second entity;

determine, from the ontology, a first ontological relationship between the first entity and the second entity;

analyze the first passage to determine whether there are intervening nodes within a semantic parse of the first passage that confirm the first ontological relationship expressed in the ontology, wherein the analysis of the first passage is encoded as a congruency score for the first ontological relationship; and generate a relationship annotation between the first entity and the second entity in the first passages based on the congruency score being within a threshold.

9. The system of claim 8, wherein analyzing the first passage comprises:

generating a graph of the first passage, the graph comprising a plurality of nodes representing a plurality of words and phrases in the first passage; and analyzing a semantic linkage between the plurality of nodes and the first ontological relationship to determine the congruency score.

10. The system of claim 9, wherein analyzing the semantic linkage between the plurality of nodes and the first ontological relationship to determine the congruency score comprises:

generating, by the processor utilizing a word embedding model, a word vector for each node in the plurality of nodes, the word vector comprising a plurality of features associated with the node; and comparing the word vector to a vector representation of the first ontological relationship to determine the congruency score.

11. The system of claim 10, wherein the congruency score comprises a geometric distance between the word vector plotted in a geometric space and the vector representation of the first ontological relationship plotted in the geometric space.

12. The system of claim 9, wherein the graph comprises a parse tree.

13. The system of claim 8, wherein the threshold is determined by a user input.

14. The system of claim 8, wherein the passage comprises a sentence.

15. A computer program product comprising a computer readable storage medium having program instructions embodied therewith, the program instructions executable by a processor to cause the processor to perform a method comprising:

determining, by the processor, an ontology, the ontology comprising a plurality of ontological relationships;

receiving, by the processor, a plurality of passages;

determining, by the processor, a target set of co-occurring entities comprising a first entity and a second entity;

determining a first passage in the plurality of passages that includes the first entity and the second entity;

determining, from the ontology, a first ontological relationship between the first entity and the second entity;

analyzing the first passage to determine whether there are intervening nodes within a semantic parse of the first passage that confirm the first ontological relationship expressed in the ontology, wherein the analysis of the first passage is encoded as a congruency score for the first ontological relationship; and generating a relationship annotation between the first entity and the second entity in the first passages based on the congruency score being within a threshold.

16. The computer program product of claim 15, wherein analyzing the first passage comprises:

generating a graph of the first passage, the graph comprising a plurality of nodes representing a plurality of words and phrases in the first passage; and analyzing a semantic linkage between the plurality of nodes and the first ontological relationship to determine the congruency score.

17. The computer program product of claim 16, wherein analyzing the semantic linkage between the plurality of nodes and the first ontological relationship to determine the congruency score comprises:

generating, by the processor utilizing a word embedding model, a word vector for each node in the plurality of nodes, the word vector comprising a plurality of features associated with the node; and comparing the word vector to a vector representation of the first ontological relationship to determine the congruency score.

18. The computer program product of claim 17, wherein the congruency score comprises a geometric distance between the word vector plotted in a geometric space and the vector representation of the first ontological relationship plotted in the geometric space.

19. The computer program product of claim 16, wherein the graph comprises a parse tree.

20. The computer program product of claim 15, wherein the passage comprises a sentence.

\* \* \* \* \*